US011414175B2

(12) United States Patent
Zingaro et al.

(10) Patent No.: US 11,414,175 B2
(45) Date of Patent: Aug. 16, 2022

(54) METHOD AND SYSTEM FOR OPERATING AN AIRCRAFT POWERPLANT

(71) Applicant: PRATT & WHITNEY CANADA CORP., Longueuil (CA)

(72) Inventors: Giancarlo Zingaro, Pointe-Claire (CA); Sean McCarthy, Beaconsfield (CA); Jasraj Chahal, Lasalle (CA); Benjamin Bregani, Montreal (CA); Carmine Lisio, Laval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 281 days.

(21) Appl. No.: 16/371,608

(22) Filed: Apr. 1, 2019

(65) Prior Publication Data
US 2020/0307774 A1 Oct. 1, 2020

(51) Int. Cl.
*B64C 11/44* (2006.01)
*B64D 31/00* (2006.01)
*F02D 29/02* (2006.01)
*B64D 27/10* (2006.01)

(52) U.S. Cl.
CPC .............. *B64C 11/44* (2013.01); *B64D 31/00* (2013.01); *F02D 29/02* (2013.01); *B64D 27/10* (2013.01)

(58) Field of Classification Search
CPC ......... B64D 27/10; B64D 31/00; F02D 29/02; B64C 11/44; B64C 11/305
See application file for complete search history.

(56) References Cited

U.S. PATENT DOCUMENTS

| 4,648,798 A | * | 3/1987 | Voisard | B64C 11/38 |
| | | | | 416/154 |
| 4,958,289 A | * | 9/1990 | Sum | B64C 11/305 |
| | | | | 416/27 |
| 5,029,091 A | * | 7/1991 | Schneider | B64C 11/30 |
| | | | | 701/99 |
| 5,213,471 A | | 5/1993 | Miller et al. | |

(Continued)

FOREIGN PATENT DOCUMENTS

| CN | 103760906 B | 6/2016 |
| EP | 3351772 A1 | 7/2018 |

OTHER PUBLICATIONS

Flight Safety Foundation, FAF ALAR Briefing Note 8.4—Braking Devices (2000), Flight Safety Digest Aug.-Nov. 2000 (Year: 2000).*

(Continued)

*Primary Examiner* — Jeff A Burke
*Assistant Examiner* — Arslan Azhar
(74) *Attorney, Agent, or Firm* — Norton Rose Fulbright Canada LLP

(57) ABSTRACT

Methods and systems for operating an aircraft powerplant comprising an engine coupled to a variable-pitch propeller capable of generating forward and reverse thrust are described herein. A request to enable a mode for automated reverse thrust is received. Reverse thrust conditions are determined to have been met when the aircraft is on-ground, a blade angle of the propeller is below a blade angle threshold and a position of a power lever is at a selected idle region of the power lever. Reverse thrust of the propeller is triggered when the mode for automated reverse thrust is enabled and the reverse thrust conditions have been met.

20 Claims, 7 Drawing Sheets

(56) References Cited

U.S. PATENT DOCUMENTS

| | | |
|---|---|---|
| 6,311,928 B1 | 11/2001 | Presz, Jr. et al. |
| 7,007,454 B2 | 3/2006 | Dehu et al. |
| 7,559,507 B2 | 7/2009 | Harrison et al. |
| 7,586,422 B2 | 9/2009 | Goodman et al. |
| 7,797,095 B2 | 9/2010 | Rado |
| 7,818,100 B2 | 10/2010 | Goodman et al. |
| 7,853,370 B2 | 12/2010 | Coulmeau et al. |
| 7,946,106 B2 | 5/2011 | Dehu et al. |
| 8,155,876 B2 | 4/2012 | White et al. |
| 8,355,831 B2 | 1/2013 | Villaume et al. |
| 8,436,750 B2 | 5/2013 | Fabre et al. |
| 8,464,511 B1 | 6/2013 | Ribarov et al. |
| 8,552,888 B2 | 10/2013 | Perrie et al. |
| 8,651,811 B2 | 2/2014 | Danielson |
| 8,698,444 B2 | 4/2014 | Malkin et al. |
| 8,733,698 B2 | 5/2014 | Abrial et al. |
| 9,008,873 B1 | 4/2015 | Phillips et al. |
| 9,043,050 B2 | 5/2015 | Goodman et al. |
| 9,120,559 B2 | 9/2015 | Danielson et al. |
| 9,120,579 B2 | 9/2015 | De Smet et al. |
| 9,163,583 B2 | 10/2015 | James |
| 9,164,505 B1 | 10/2015 | Peck et al. |
| 9,188,082 B2 | 11/2015 | Colin et al. |
| 9,272,789 B2 | 3/2016 | Prud'Homme-Lacroix |
| 9,296,488 B2 | 3/2016 | McKeown et al. |
| 9,316,520 B2 | 4/2016 | Horabin et al. |
| 9,366,147 B2 | 6/2016 | Gallet |
| 9,412,210 B2 | 8/2016 | Raby et al. |
| 9,430,948 B2 | 8/2016 | Henderson |
| 9,472,107 B2 | 10/2016 | Lissajoux et al. |
| 9,482,183 B2 | 11/2016 | Maalioune et al. |
| 9,623,958 B2 | 4/2017 | Martin Moreno et al. |
| 9,708,073 B2 | 7/2017 | Pretty et al. |
| 9,771,878 B2 | 9/2017 | Lu et al. |
| 9,821,901 B2 | 11/2017 | Duke et al. |
| 9,874,176 B2 | 1/2018 | Nakhjavani |
| 9,920,695 B2 | 3/2018 | Endres |
| 9,951,718 B2 | 4/2018 | Brown |
| 10,119,495 B1 | 11/2018 | Nestico et al. |
| 10,343,786 B2 | 7/2019 | Nestico et al. |
| 10,378,452 B1 | 8/2019 | Barmichev et al. |
| 10,429,856 B2 | 10/2019 | Guedes et al. |
| 10,458,363 B2 | 10/2019 | Moradell-Casellas |
| 10,501,194 B2 | 12/2019 | Knapp et al. |
| 10,518,897 B2 | 12/2019 | Charbonnier et al. |
| 10,528,856 B2 | 1/2020 | Kuzbari et al. |
| 10,543,909 B2 | 1/2020 | Kipp et al. |
| 2005/0006524 A1* | 1/2005 | Villaume ............ G05D 1/0083 244/111 |
| 2010/0135799 A1 | 6/2010 | Morgan |
| 2011/0264308 A1 | 10/2011 | Perrie et al. |
| 2013/0184904 A1 | 7/2013 | Gadzinski |
| 2016/0121998 A1* | 5/2016 | Martin Moreno ..... B64D 31/02 701/3 |
| 2016/0159461 A1* | 6/2016 | Lu .................. B64D 27/10 416/1 |
| 2016/0229547 A1* | 8/2016 | Fisher .................. B64C 11/303 |
| 2017/0145956 A1 | 5/2017 | Miller et al. |
| 2018/0216573 A1 | 8/2018 | Kopecek |
| 2019/0055901 A1 | 2/2019 | Lamarre et al. |
| 2019/0056740 A1* | 2/2019 | Westphal ............ G05D 1/0055 |
| 2019/0279439 A1 | 9/2019 | Fields et al. |
| 2019/0293023 A1 | 9/2019 | Guerinot et al. |
| 2020/0025091 A1 | 1/2020 | De Pau, Jr. et al. |
| 2020/0025137 A1 | 1/2020 | Fort et al. |
| 2020/0031483 A1 | 1/2020 | Guillois |

OTHER PUBLICATIONS

Extended European Search Report dated Aug. 26, 2020 in counterpart European application No. 20167610.3.

\* cited by examiner

METHOD AND SYSTEM FOR OPERATING AN AIRCRAFT POWERPLANT

TECHNICAL FIELD

The present disclosure relates generally to aircraft powerplants, and more particularly to controlling powerplant operation.

BACKGROUND OF THE ART

For propeller driven aircraft, a control system may adjust the blade angle of the propeller blades to cause a transition from forward to reverse thrust, for example during the landing phase. The transition from forward to reverse thrust requires that the propeller blades transition through a zone of operation known as "disking" or blade angle of minimum rotational drag, where the engine typically operates at low power. A pilot uses feedback of the position of the propeller blade angle to determine when to apply an increase in engine power at landing. However, if an increase in engine power is applied too soon when the propeller blades are transitioning from forward to reverse pitch during landing, positive thrust may occur rather than reverse thrust.

As such, there is a need for improvement.

SUMMARY

In one aspect, there is provided a method for operating an aircraft powerplant comprising an engine coupled to a variable-pitch propeller capable of generating forward and reverse thrust. The method comprises receiving a request to enable a mode for automated reverse thrust, determining that reverse thrust conditions have been met when the aircraft is on-ground, a blade angle of the propeller is below a blade angle threshold and a position of a power lever is at a selected idle region of the power lever, and triggering reverse thrust of the propeller when the mode for automated reverse thrust is enabled and the reverse thrust conditions have been met.

In another aspect, there is provided a system for operating an aircraft powerplant comprising an engine coupled to a variable-pitch propeller capable of generating forward and reverse thrust. The system comprises a processing unit and a non-transitory computer-readable memory having stored thereon program instructions. The program instructions are executable by the processing unit for receiving a request to enable a mode for automated reverse thrust, determining that reverse thrust conditions have been met when the aircraft is on-ground, a blade angle of the propeller is below a blade angle threshold and a position of a power lever is at a selected idle region of the power lever, and triggering reverse thrust of the propeller when the mode for automated reverse thrust is enabled and the reverse thrust conditions have been met.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
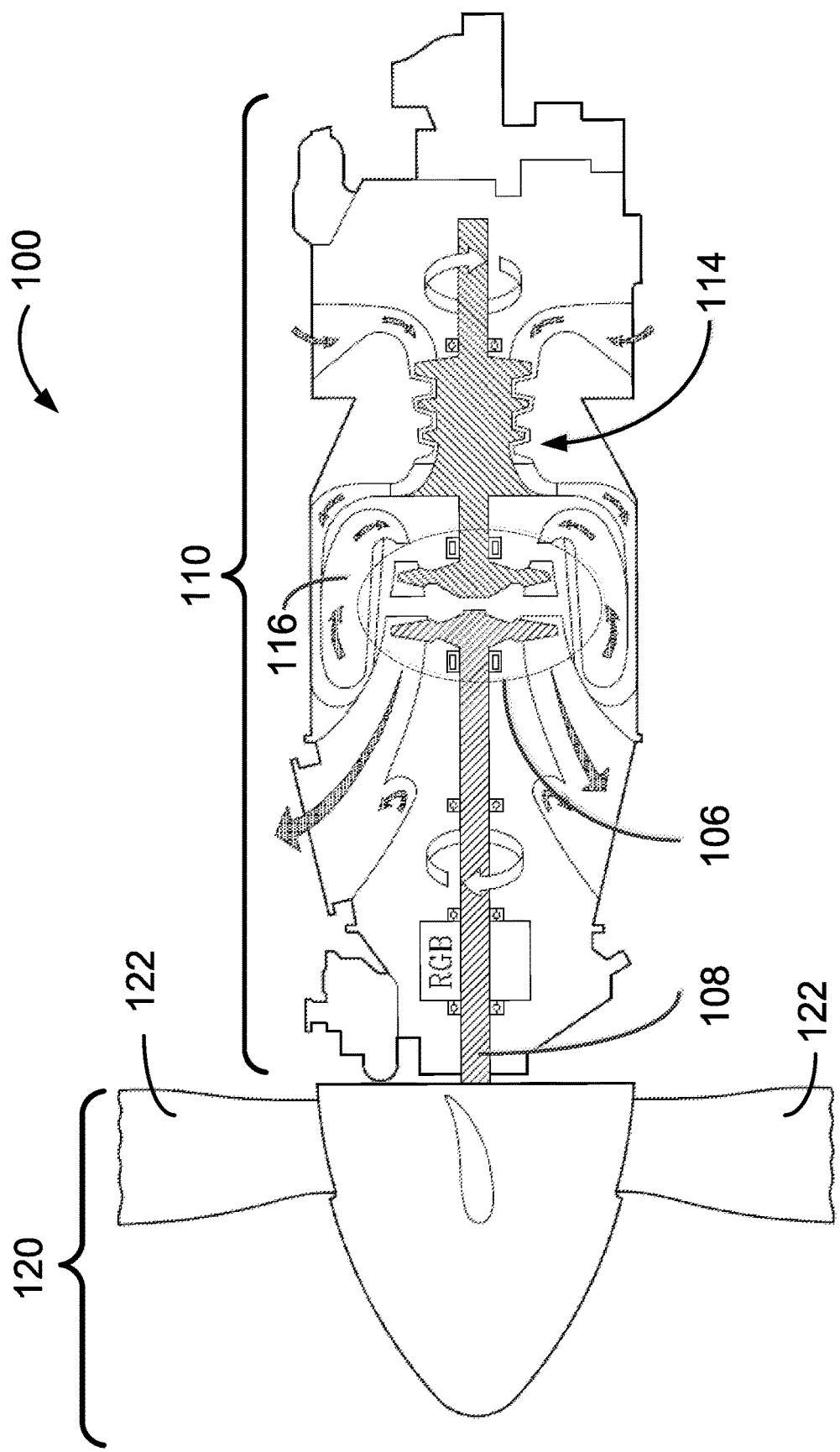
FIG. 1 is a schematic of an example gas turbine engine and propeller, in accordance with one or more embodiments.

FIG. 1 illustrates an aircraft powerplant 100 for an aircraft of a type preferably provided for use in subsonic flight, generally comprising an engine 110 and a propeller 120. The powerplant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases driving the rotation of the propeller through shaft 108. The propeller 120 converts rotary motion from the shaft 108 of the engine 110 to provide propulsive force for the aircraft, also known as thrust. The propeller 120 is variable-pitch propeller capable of generating forward and reverse thrust. The propeller 120 comprises two or more propeller blades 122. A blade angle of the propeller blades 122 may be adjusted. The blade angle may be referred to as a beta angle, an angle of attack or a blade pitch. The powerplant 100 may be implemented to comprise a single or multi-spool gas turbine engine, where the turbine section 106 is typically connected to the propeller 120 through a reduction gearbox (RGB).

Figure 2A:
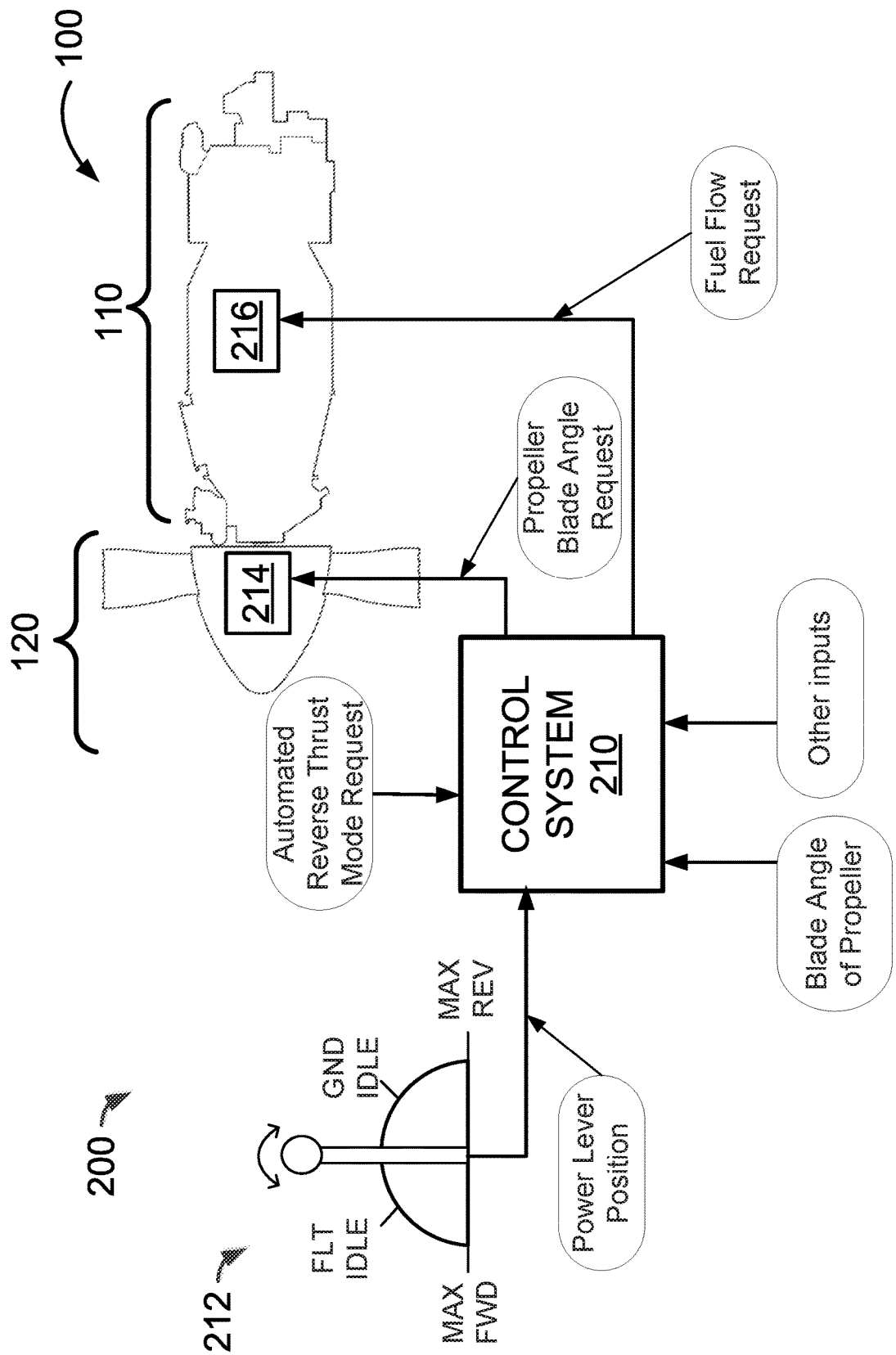
FIG. 2A is a schematic diagram illustrating a system for controlling operation of an engine and propeller, in accordance with one or more embodiments.

With reference to FIG. 2A, there is illustrated a system 200 for operating the powerplant 100 in accordance with an embodiment. In this embodiment, a control system 210 receives a power lever or throttle position from a power lever 212 of the aircraft under control by a pilot or other operator of the aircraft. The power lever position is indicative of the type of thrust demanded by the power lever 212. Several power lever positions can be selected, including those for (1) maximum forward thrust (MAX FWD), which is typically used during takeoff; (2) flight idle (FLT IDLE), which may be used in flight during approach or during taxiing on the ground; (3) ground idle (GND IDLE), at which the propeller 120 is spinning, but providing very low thrust; (4) maximum reverse thrust (MAX REV), which is typically used at landing in order to slow the aircraft. Intermediate positions between the abovementioned positions can also be selected. The power lever positions may vary depending on practical implementations of the power lever 212. In some embodiments, the power lever 212 does not comprise a region for requesting reverse thrust.

The control system 210 receives additional inputs pertaining to the operation of the propeller 120, engine 110 and/or the aircraft. In the illustrated embodiment, the control system 210 receives a blade angle of the propeller 120. In some embodiments, the control system 210 receives an aircraft status indicative of whether the aircraft is on-ground or in-flight. For example, the aircraft status may be a weight-on-wheels condition received from an aircraft computer. In some embodiments, the control system 210 determines the aircraft status based on one or more of the additional inputs. In some embodiments, the control system 210 receives a forward airspeed of the aircraft. The additional inputs may vary depending on practical implementations.

In general, the control system 210 is configured to control the engine 110 and the propeller 120 based on the received inputs. The control system 210 controls the engine 110 by outputting a fuel flow request to an engine actuator 216 for adjusting engine fuel flow and controls the propeller 120 by outputting a propeller blade angle request to a propeller actuator 214 for adjusting the blade angle of the propeller 120. The engine actuator 216 and/or propeller actuator 214 may each be implemented as a torque motor, a stepper motor, or any other suitable actuator. The engine actuator 216 may be implemented as one or more valves that regulate fuel flow from a fuel source to the engine 110. The control system 210 determines the fuel flow request for adjusting engine fuel flow and the propeller blade angle request for adjusting the blade angle of the propeller 120 based on the received inputs. The propeller actuator 214 may control hydraulic oil pressure to adjust the blade angle based on the propeller blade angle request. In some embodiments, the propeller blade angle request is an oil flow request to set the propeller blade angle. The engine actuator 216 can adjust the fuel flow to the engine 110 based on the fuel flow request. While the engine actuator 216 and the propeller actuator 214 are illustrated as being part of the engine 110 and the propeller 120, respectively, it should be understood that this is for illustrative purposes only and that the engine actuator 216 and/or the propeller actuator 214 may, in some embodiments, be separate from the powerplant 100. While the controller 210 is illustrated as separate from the powerplant 100, it should be understood that this is for illustrative purposes only and that the controller 210 may, in some embodiments, be integrated with the powerplant 100.

The control system 210 is configured to receive a request to enable a mode for automated reverse thrust of the propeller 120 (referred to herein as the "automated reverse thrust mode"). The automated reverse thrust mode is a mode of the control system 210 for operating the engine 110 and the propeller 120 in a manner to cause the propeller to provide reverse thrust at landing without a direct request for reverse thrust from the power lever 212. The request to enable the automated reverse thrust mode may be received in various manners, for example from an aircraft computer connected to a cockpit interface (e.g., an illuminated pushbutton) used to select and deselect the automated reverse thrust mode. Alternatively or in combination therewith, one or more of the power lever positions may correspond to a request for the automated reverse thrust mode. The control system 210 is configured to trigger reverse thrust of the propeller 120 when the automated reverse thrust mode is enabled and when certain reverse thrust conditions have been met.

In accordance with some embodiments, the control system 210 is configured to determine that the reverse thrust conditions are met when the aircraft is on-ground, a blade angle of the propeller 120 is below a blade angle threshold and a position of the power lever 212 is at a selected idle region of the power lever 212. In some embodiments, the reverse thrust conditions are met when the aforementioned conditions are met and a forward airspeed of the aircraft is below a minimum forward speed threshold.

The selected idle region may be a range of the power lever 212. For example, the selected idle region can be a range between the ground idle position and the flight idle position of the power lever 212. In some embodiments, the range between the ground idle position and the flight idle position of the power lever 212 is inclusive of the ground idle position and/or the flight idle position. The selected idle region may be a specific position of the power lever 212. For example, the specific position may be the flight idle position of the power lever 212. It should be appreciated that the selected idle region does not correspond to a region of the power lever 212 normally used for requesting reverse thrust.

Triggering reverse thrust corresponds to any response mechanism(s) and/or action(s) to cause the propeller to provide reverse thrust. Triggering reverse thrust comprises the control system 210 adjusting the blade angle of the propeller 120 and adjusting the engine power by adjusting engine fuel flow to cause the propeller 120 to provide reverse thrust. In some embodiments, the control system 210 triggers reverse thrust by decreasing the blade angle of the propeller 120 at a predetermined rate towards a full reverse blade angle and increasing engine power at a predetermined rate towards a full reverse power of the engine 110. When applicable, the control system 210 reduces engine power and adjusts the blade angle of the propeller 120 to stop the propeller 120 from providing reverse thrust.

It should be appreciated that by triggering reverse thrust when the automated reverse thrust mode is enabled and when reverse thrust conditions have been met, reverse thrust occurs automatically without any direct request from the pilot (i.e., without the pilot moving the power lever 212 into a reverse thrust regime of the power lever 212). It should further be appreciated that by not having the pilot move the power lever 212 into a reverse thrust regime of the power lever 212 to request reverse thrust, this prevents the propeller 120 from inadvertently providing positive thrust.

Figure 2B:
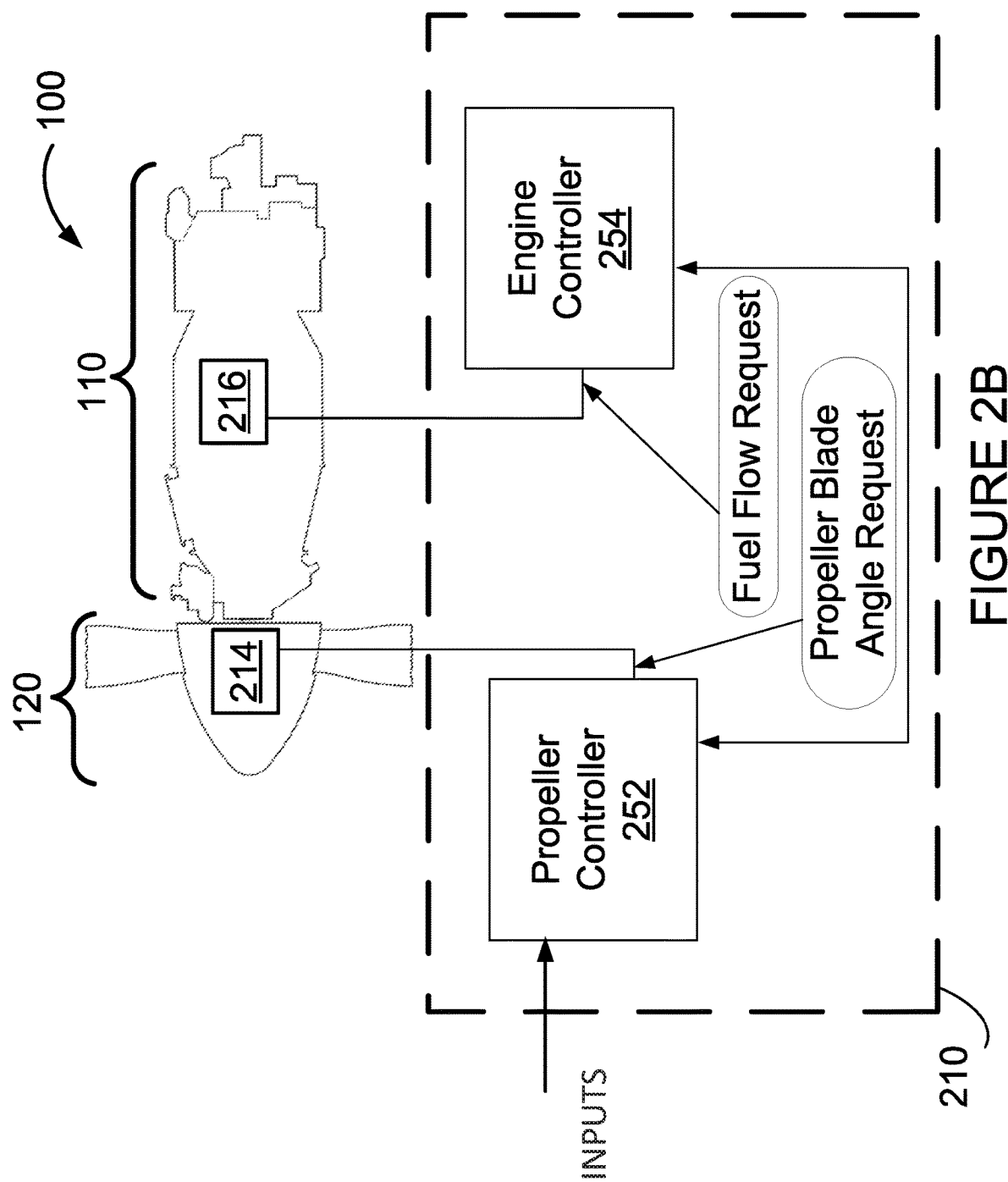
FIG. 2B is a schematic diagram illustrating an example control system, in accordance with one or more embodiments.

With reference to FIG. 2B, the control system 210 is illustrated in accordance with one or more embodiments. In this embodiment, a propeller controller 252 controls the propeller 120 and an engine controller 254 controls the engine 110. The propeller controller 252 determines and outputs the propeller blade angle request and the engine controller 254 determines and outputs the fuel flow request. The propeller controller 252 receives the inputs (e.g., the power lever position, blade angle, aircraft status, forward airspeed and/or any other suitable inputs) and is in electronic communication with the engine controller for providing one or more of the received inputs to the engine controller 254. In some embodiments, the engine controller 254 additionally or alternatively receives the inputs (e.g., the power lever position, blade angle, aircraft status, forward airspeed and/or any other suitable inputs). In some embodiments, the engine controller 254 provides one or more of the received inputs to the propeller controller 252. In some embodiments, the propeller controller 252 may determine the blade angle of the propeller 120 and provide the blade angle to the engine controller 254. In alternative embodiments, the functionalities of the propeller controller 252 and the engine controller 254 may be implemented in a single controller.

To further illustrate automating of reverse thrust at landing of the aircraft, a specific and non-limiting example will now be described. When the aircraft is in-flight (e.g., during descent of the aircraft), the pilot enables the automated reverse thrust mode by pushing an automated reverse thrust mode push-button of the cockpit interface from OFF to ON.

As the aircraft approaches the runway, the pilot sets the power lever 212 at the flight idle position. When the aircraft touches down on the ground, the pilot maintains the power lever 212 at the flight idle position. When all of the reverse thrust conditions have been met, and as the reverse thrust mode has been enabled, the engine controller 254 automatically adjusts the engine power and the propeller controller 252 automatically adjusts the blade angle of the propeller 120 such that there is a transition to maximum reverse power and maximum reverse blade angle, resulting in maximum reverse thrust. Once conditions for ending reverse thrust exist, the engine controller 254 reduces the engine power and the propeller controller 252 adjusts the blade angle of the propeller 120 to correspond to the engine power and blade angle for the ground idle position in order for the propeller 120 to stop providing reverse thrust.

Figure 2C:
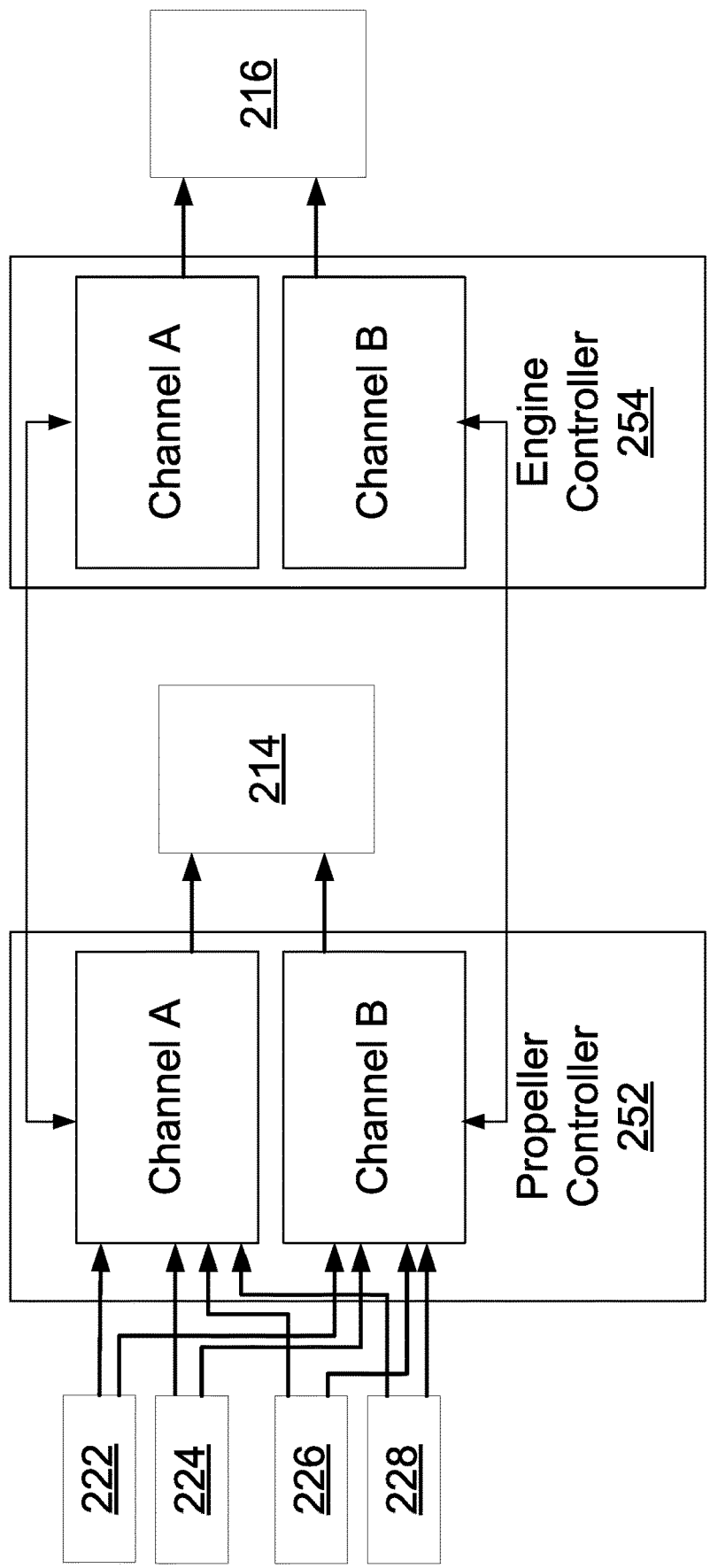
FIG. 2C is a schematic diagram illustrating examples of a propeller controller and an engine controller with dual channels, in accordance with one or more embodiments.

With reference to FIG. 2C, in some embodiments, each of the propeller controller 252 and the engine controller 254 comprise two or more channels, such as channels A and B. For each of the controllers 252, 254, the channels A, B are redundant channels and one of the channels (e.g., channel A) is selected as being active, while the other channel remains in standby (e.g., channel B). When a channel is active, that channel is configured to generate and output the fuel flow request and/or the propeller blade angle request, and when a channel is in standby, that channel does not generate and output the fuel flow request or the propeller blade angle request. When a channel is in standby, the channel is functional and able to take over control when needed. If it is determined that the presently active channel or one of the actuators 214, 216 is faulty or inoperative, the presently active channel may be inactivated and the channel in standby is activated. Similarly, if, during operation, an input to a presently active channel is erroneous or inexistent, the presently active channel may be inactivated and one of the channels in standby is activated.

In the illustrated embodiment, each channel A, B of the propeller controller 252 receives the power lever position from at least one sensor 224. Each channel A, B of the propeller controller 252 receives the power lever position from at least one sensor 222 (or aircraft computer). Each channel A, B of the propeller controller 252 receives the blade angle of the propeller 120 from at least one sensor 224 (or aircraft computer). Each channel A, B of the propeller controller 252 receives the aircraft status from at least one sensor 226 (or aircraft computer). Each channel A, B of the propeller controller 252 also receives the forward airspeed from at least one sensor 228 (or aircraft computer). One or more of the sensors 222, 224, 226, 228 may be implemented with a dual sensing devices, where one sensing element provides a first measurement to channel A and the other sensing element provides a second measurement to channel B. The propeller actuator 214 (e.g., a dual input pitch change mechanism actuator) modulates the blade angle based on the propeller blade angle request from the active channel of the propeller controller 252. In this example, the engine controller 254 receives the blade angle, the power lever position, aircraft status and forward airspeed from the propeller controller 254. In alternative embodiments, the engine controller 254 receives the blade angle, the power lever position, aircraft status and forward airspeed from sensors, such as the sensors 222, 224, 226, 228, from an aircraft computer, or a combination thereof. The engine actuator 216 (e.g., a dual input fuel metering toque motor) modulates fuel flow to engine 110 based on the fuel flow request from the active channel of the engine controller 254. In alternate embodiments, the functionalities of the propeller controller 252 and the engine controller 254 of FIG. 2C may be implemented in a single dual-channel controller.

Figure 3A:
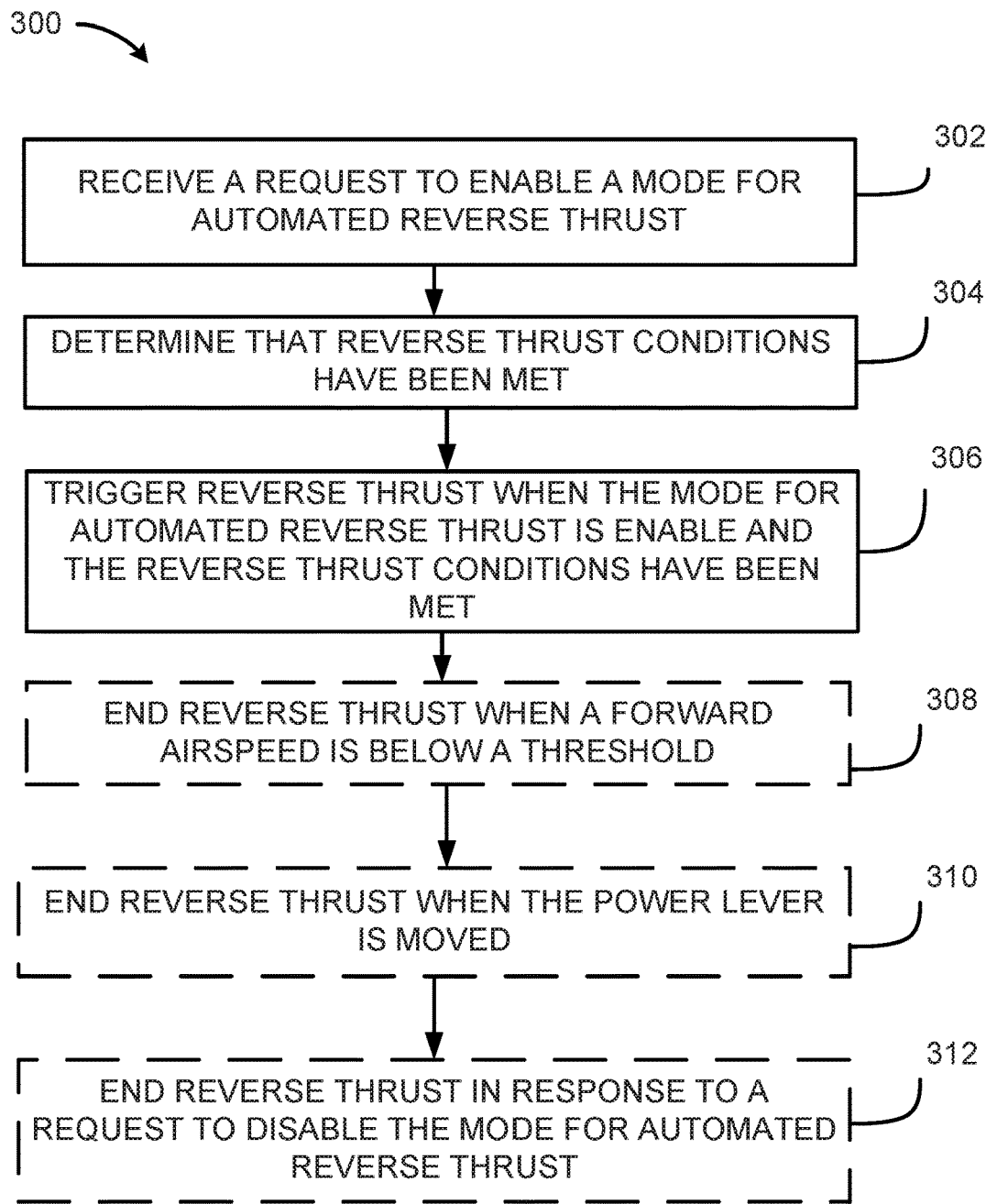
FIG. 3A is a flowchart of a method for controlling operation of an engine and a propeller, in accordance with one or more embodiments.

With reference to FIG. 3A, there is illustrated a flowchart of a method 300 for operating a powerplant, such as the powerplant 100. The method 300 may be performed by the control system 210, the engine controller 254, propeller controller 252 or a combination thereof. At step 302, a request to enable the mode for automated reverse thrust is received.

At step 304, the method 300 comprises determining that reverse thrust conditions have been met. In some embodiments, the reverse thrust conditions comprise a selected idle region of the power lever 212. In some embodiments, the reverse thrust conditions comprise a blade angle of the propeller 120 being below a blade angle threshold. In some embodiments, the reverse thrust conditions comprise an aircraft on-ground condition. One, two, or all three of these conditions may be used to determine that the reverse thrust conditions have been met. In some embodiments, one, two, or all three of these conditions are combined with other conditions.

In accordance with some embodiments, the reverse thrust conditions have been met when the aircraft is on-ground, a blade angle of the propeller 120 is below a blade angle threshold and a position of the power lever 212 is at a selected idle region of the power lever 212. The corresponding blade angle for the blade angle threshold may vary depending on practical implementations. For example, the blade angle threshold may correspond to a minimum blade angle at which the propeller 120 can provide reverse thrust. In some embodiments, the reverse thrust conditions have been met when the aircraft is on-ground, the blade angle of the propeller 120 is below the blade angle threshold, the position of the power lever 212 is at the selected idle region of the power lever 212 and a forward airspeed of the aircraft is below a minimum forward speed threshold. The minimum forward speed threshold corresponds to the minimum airspeed of aircraft for the enabling of automatic reverse thrust and The minimum forward speed threshold is below a minimum in-flight airspeed of the aircraft. The aircraft may be considered on-ground when a weight-on-wheels condition of the aircraft is met. Other means of determining on-ground/in-flight status of the aircraft may also be used. For example, the aircraft may be considered to be on-ground when the forward airspeed of the aircraft is below the in-flight minimum speed threshold. Accordingly, in some embodiments, the reverse thrust condition for the aircraft to be on-ground is met when the forward airspeed of the aircraft is below the minimum forward speed threshold. The reverse thrust conditions may be checked in any suitable order or concurrently. If one of the reverse thrust conditions is not met (e.g., if the aircraft is in-flight), the method may stop checking the other reverse thrust conditions.

The power lever position, the blade angle of the propeller 120, the aircraft status and/or the forward airspeed may be obtained at step 304. Each of the power lever position, the blade angle of the propeller 120, the aircraft status and/or the forward airspeed may be received from a respective measuring device comprising one or more sensors. In some embodiments, the power lever position, the blade angle of the propeller 120, the aircraft status and/or the forward airspeed are obtained via existing components as part of engine control and/or operation. For example, the power lever position, the blade angle of the propeller 120, the aircraft status and/or the forward airspeed may be provided from one of an engine controller, a propeller controller or an aircraft computer. The power lever position, the blade angle of the propeller 120, the aircraft status and/or the forward airspeed may be dynamically obtained in real time, may be obtained regularly in accordance with any predetermined time interval, or may be obtained irregularly.

At step 306, reverse thrust of the propeller 120 is triggered when the mode for automated reverse thrust is enable and when the reverse thrust conditions have been met. In some embodiments, step 306 comprises applying reverse thrust for a predetermined or dynamically determined period of time. The predetermined period of time may be any suitable time period. In some embodiments, the period of time may be determined dynamically based on the weight of the aircraft or using one or more other parameters.

In some embodiments, the method 300 comprises at step 308 ending the reverse thrust when a forward airspeed of the aircraft is below a ground minimum speed threshold. The ground minimum speed threshold corresponds to any suitable flight speed indicative that the application of reverse thrust can be stopped. For example, the ground minimum speed threshold may be the taxiing speed of the aircraft. In some embodiments, the method 300 comprises at step 310 ending the reverse thrust when the power lever 212 is moved out of the selected idle region. In some embodiments, the method 300 comprises at step 312 ending the reverse thrust in response to a request to disable the mode for automated reverse thrust.

Figure 3B:
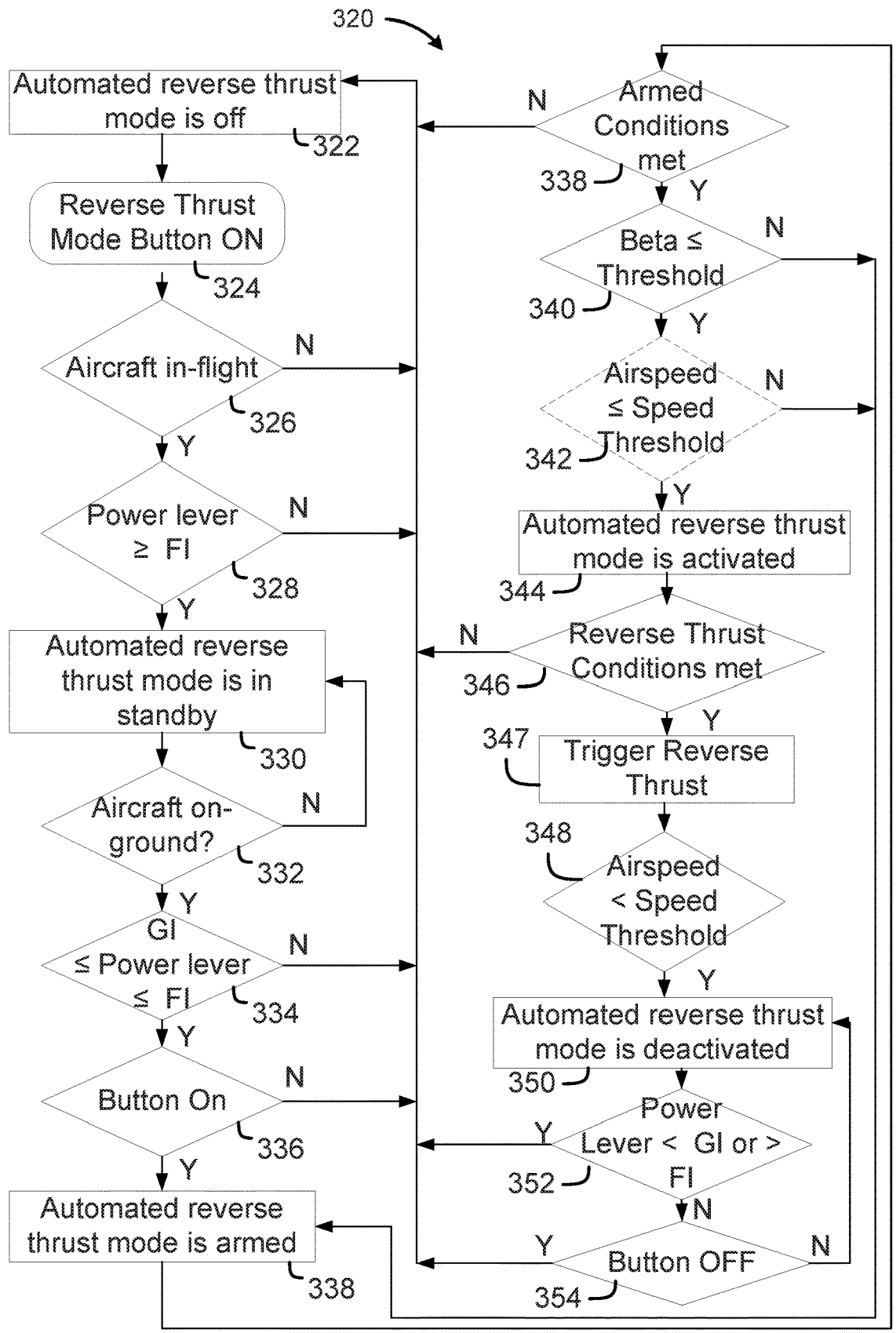
FIG. 3B is a flowchart illustrating the logic of a controller for controlling operation of an engine and propeller, in accordance with one or more embodiments.

With reference to FIG. 3B there is shown a flowchart 320 illustrating the logic of the control system 210 for operating the powerplant 100, in accordance with a specific and non-limiting embodiment. In some embodiments, the control system 210 sets the automated reverse thrust mode to various states: off, standby, armed, activated and deactivated. At 322, the automated reverse thrust mode is off. At 324, an automated reverse thrust mode push-button is actuated from OFF to ON. When the push-button is actuated from OFF to ON, a request to enable reverse thrust is provided to the control system 210. At 326, it is determined if the aircraft is in-flight. If the aircraft is not in-flight (i.e., on-ground), then the automated reverse thrust mode remains turned off. If the aircraft is in-flight, then at 328 it is determined if the power lever 212 is above the flight idle position. If the power lever 212 is below or at the flight idle position, then the automated reverse thrust mode remains turned off. If the power lever 212 is above the flight idle position, then the automated reverse thrust mode is put into standby at 330. In some embodiments, an indicator is outputted to cause a display device to indicate that the automated reverse thrust mode is in standby.

At 332, it is determined if the aircraft is on-ground. If the aircraft is not on-ground (i.e., in-flight), then the automated reverse thrust mode remains in standby and 332 is repeated. In other words, the logic waits for the aircraft to be on-ground. If the aircraft is on-ground, then at 334 it is determined if the position of the power lever 212 is between the ground idle and the flight idle positions. In this example, the selected idle region is between the ground idle and the flight idle position, inclusive of the ground idle and flight idle positions. If the position of the power lever 212 is outside of the selected idle region, then the automated reverse thrust mode is turned off. If the position of the power lever 212 is within the selected idle region, then at 336 it is determined if the push-button is still ON. If the push-button is OFF, then the automated reverse thrust mode is turned off. If the push-button is still ON, then at 338 the automated reverse thrust mode is armed. In some embodiments, an indicator is outputted to cause a display device to indicate that the automated reverse thrust mode is armed. The order of 332, 334 and 336 may vary depending on practical implementations. In some embodiments, one or more of 332, 334 and 336 may be combined.

At 338, the armed conditions of 332, 334, 336 are assessed to determine if the armed conditions are still met. If one of the armed conditions are not met, then the automated reverse thrust mode is set to off. In other words, while the automated reverse thrust mode is armed, the pilot can disable the automatic reverse thrust mode by increasing the position of the power lever 212 above the flight idle position, decreasing the position of the power lever 212 below the ground idle position, or deselects the push-button from ON to OFF. When the automatic reverse thrust mode is disabled, the engine power and blade angle of the propeller 120 are set as function of the position of the power lever 212, as set by the pilot.

If the armed conditions are met, then at 340, it is determined if the blade angle of the propeller 120 is below the blade angle threshold. If the blade angle of the propeller 120 is not below the blade angle threshold, then the automated reverse thrust mode remains armed and then 338 is repeated. In other words, when the blade angle is not below the blade angle threshold, the logic waits for blade angle to become below the blade angle threshold. If the blade angle of the propeller 120 is below the blade angle threshold, then at 342 it is determined if the airspeed of the aircraft is below the minimum forward speed threshold. If the airspeed is not below the minimum forward speed threshold, then the automated reverse thrust mode remains armed and then 338 is repeated. In other words, when the airspeed is not below the minimum forward speed threshold, the logic waits for the airspeed to be below the minimum forward speed threshold. If the airspeed is below the minimum forward speed threshold, then at 344 the automated reverse thrust mode is activated. The order of 338, 340 and 342 may vary depending on practical implementations. In some embodiments, one or more of 338, 340 and 342 may be combined. In some embodiments, 342 may be omitted. In some embodiments, the automated reverse thrust mode is activated in response to the reverse thrust conditions of 338, 340 and 342 being met. In some embodiments, an indicator is outputted to cause a display device to indicate that the automated reverse thrust mode is activated.

At 346, it is determined if the reverse thrust conditions of 338, 340 and 342 have been met. If the reverse thrust conditions are not met, then the automated reverse thrust mode is turned off. If the reverse thrust conditions have been met, then reverse thrust is triggered at 347. The reverse thrust is provided while the reverse thrust conditions remain met. In other words, the pilot may disable the automated reverse thrust by causing one of the reverse thrust condition to no longer be met. When the automatic reverse thrust mode is disabled, the engine power and blade angle of the propeller 120 are set as function of the position of the power lever 212, as set by the pilot.

At 348, it is determined if the forward airspeed of the aircraft is below the ground minimum speed threshold. Once the forward airspeed of the aircraft is below the ground minimum speed threshold, at 350, a transition to ground idle settings occurs and reverse thrust is ended to deactivate the automated reverse thrust mode. In some embodiments, an indicator is outputted to cause a display device to indicate that the automated reverse thrust mode is deactivated. In alternative embodiments, 348 may be omitted and the reverse thrust applied at 347 may be applied for a predetermined period of time or for a period of time determined based on the weight of the aircraft.

In some embodiments, when the automated reverse thrust mode is deactivated, the propeller controller 252 automatically sets the blade angle of the propeller 120 to the blade angle associated with the ground idle position and the engine controller 252 sets the engine power to the engine power associated with the ground idle position, even though the position of the power lever 212 may not be set at the ground idle position (e.g., the position of the power lever 212 could be at the flight idle position).

At 352, it is determined if the position of the power lever 212 is above ground idle position or below flight idle position. The pilot may manually move the power lever 212 to the ground idle position after reverse thrust has stopped. In some embodiments, the power lever 212 is automatically moved to the ground idle position by an actuator in response to ending of the reverse thrust. If the power lever 212 is below the ground idle or above flight idle position, the automated reverse thrust mode is turned off. If the power lever 212 is still in between ground idle and flight idle position, at 354 it is determined if the push-button is OFF. The pilot may push the push-button to the OFF state after reverse thrust has ended or in order to cause the reverse thrust to stop. If the push-button is OFF, the automated reverse thrust mode is turned off. If push-button is not OFF, the logic waits until either the push-button is OFF or the power lever 212 is at the ground idle position. The order of 352 and 354 may vary depending on practical implementations. In some embodiments, 352 and 354 may be combined. When the flowchart 320 returns to 322, the push-button would automatically be placed into OFF. In some embodiments, an indicator is outputted to cause a display device to indicate that the automated reverse thrust mode is turned off.

Figure 4:
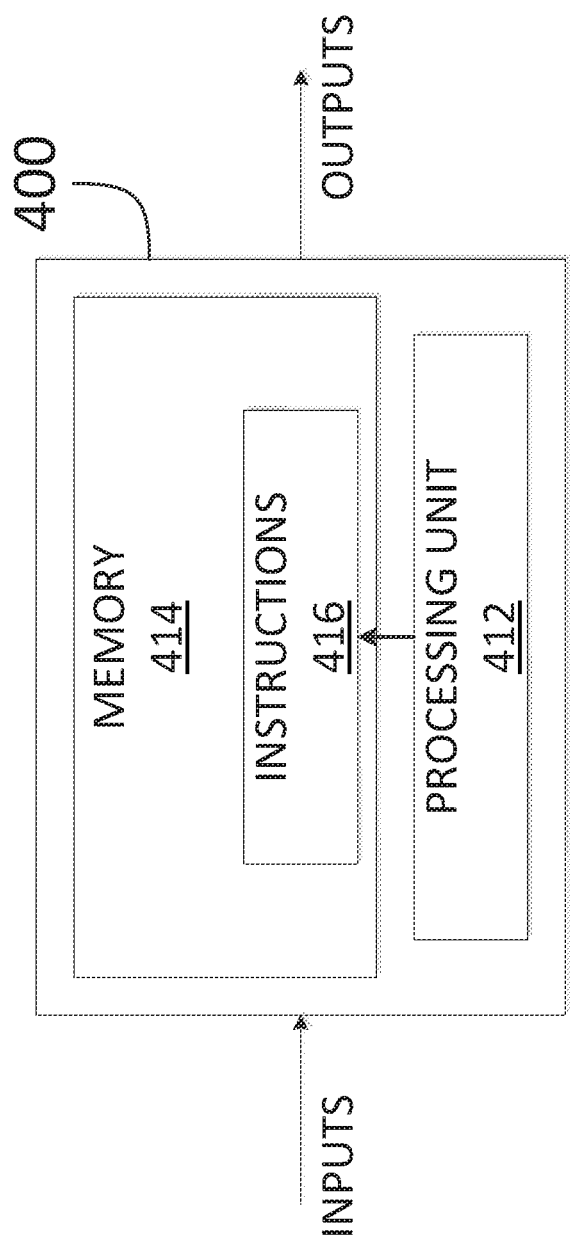
FIG. 4 is a block diagram of an example computing device for controlling operation of an engine and/or propeller, in accordance with one or more embodiments.

With reference to FIG. 4, an example of a computing device 400 is illustrated. The control system 210 may be implemented with one or more computing devices 400. For example, each of the propeller controller 252 and the engine controller 254 may be implemented by a separate computing device 400. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory; erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the computing device 400 can be implemented as part of a full-authority digital engine controls (FADEC) or other similar device, including electronic engine control (EEC), engine control unit (ECU), electronic propeller control, propeller control unit, and the like.

The methods and systems for operating an engine described herein may be implemented in a high level procedural or object oriented programming or scripting language, or a combination thereof, to communicate with or assist in the operation of a computer system, for example the computing device 400. Alternatively, the methods and systems for operating an engine may be implemented in assembly or machine language. The language may be a compiled or interpreted language. Program code for implementing the methods and systems for operating an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating an aircraft powerplant comprising an engine coupled to a variable-pitch propeller capable of generating forward and reverse thrust, the method comprising:
   receiving a request to enable a mode for automated reverse thrust, the request originating from a source other than a reverse thrust regime of a power lever of the aircraft;
   determining that reverse thrust conditions have been met when the aircraft is on-ground, a blade angle of the propeller is below a blade angle threshold and a position of the power lever is at a selected idle region of the power lever; and
   triggering reverse thrust of the propeller when:
      the mode for automated reverse thrust is enabled;
      the reverse thrust conditions have been met in absence of a direct request for reverse thrust from the power lever of the aircraft; and
      the position of the power lever is at the selected idle region of the power lever.

2. The method of claim 1, wherein the selected idle region is a range between a ground idle position and a flight idle position of the power lever, inclusive of the ground idle position and the flight idle position.

3. The method of claim 1, wherein the selected idle region is a flight idle position of the power lever.

4. The method of claim 1, wherein the aircraft is on ground when a weight-on-wheels condition of the aircraft is met.

5. The method of claim 1, further comprising determining that the reverse thrust conditions have been met when a forward airspeed of the aircraft is below a minimum forward speed threshold.

6. The method of claim 1, wherein triggering reverse thrust comprises decreasing the blade angle of the propeller at a predetermined rate towards a full reverse blade angle and increasing engine power at a predetermined rate towards a full reverse power of the engine.

7. The method of claim 1, wherein triggering reverse thrust of the propeller comprises applying reverse thrust for a period of time determined based on a weight of the aircraft.

8. The method of claim 1, further comprising ending the reverse thrust when a forward airspeed of the aircraft is below a ground minimum speed threshold.

9. The method of claim 1, further comprising ending the reverse thrust when the power lever is moved out of the selected idle region.

10. The method of claim 1, further comprising ending the reverse thrust in response to receiving a request to disable the mode for automated reverse thrust.

11. A system for operating an aircraft powerplant comprising an engine coupled to a variable-pitch propeller capable of generating forward and reverse thrust, the system comprising:
   at least one processing unit; and
   at least one non-transitory computer-readable memory having stored thereon program instructions executable by the processing unit for:
      receiving a request to enable a mode for automated reverse thrust, the request originating from a source other than a reverse thrust regime of a power lever of the aircraft;
      determining that reverse thrust conditions have been met when the aircraft is on-ground, a blade angle of the propeller is below a blade angle threshold and a position of the power lever is at a selected idle region of the power lever; and
      triggering reverse thrust of the propeller when:
         the mode for automated reverse thrust is enabled;
         the reverse thrust conditions have been met in absence of a direct request for reverse thrust from the power lever of the aircraft; and
         the position of the power lever is at the selected idle region of the power lever.

12. The system of claim 11, wherein the selected idle region is a range between a ground idle position and a flight idle position of the power lever, inclusive of the ground idle position and the flight idle position.

13. The system of claim 11, wherein the selected idle region is a flight idle position of the power lever.

14. The system of claim 11, wherein the aircraft is on ground when a weight-on-wheels condition of the aircraft is met.

15. The system of claim 11, wherein the program instructions are further executable by the at least one processing unit for determining that the reverse thrust conditions have been met when a forward airspeed of the aircraft is below a minimum forward speed threshold.

16. The system of claim 11, wherein triggering reverse thrust comprises decreasing the blade angle of the propeller at a predetermined rate towards a full reverse blade angle and increasing engine power at a predetermined rate towards a full reverse power of the engine.

17. The system of claim 11, wherein triggering reverse thrust of the propeller comprises applying reverse thrust for a period of time determined based on a weight of the aircraft.

18. The system of claim 11, wherein the program instructions are further executable by the at least one processing unit for ending the reverse thrust when a forward airspeed of the aircraft is below a ground minimum speed threshold.

19. The system of claim 11, wherein the program instructions are further executable by the at least one processing unit for ending the reverse thrust when the power lever is moved out of the selected idle region.

20. The system of claim 11, wherein the program instructions are further executable by the at least one processing unit for ending the reverse thrust in response to receiving a request to disable the mode for automated reverse thrust.

* * * * *